United States Patent [19]

Hotta et al.

[11] 4,398,291
[45] Aug. 9, 1983

[54] SATELLITE COMMUNICATION SYSTEM FOR SWITCHING FORMATS WITH REFERENCE TO SUPER-FRAME TIME SLOTS

[75] Inventors: Toshinori Hotta; Yukio Takimoto, both of Tokyo, Japan

[73] Assignee: Nippon Electric Co., Ltd., Tokyo, Japan

[21] Appl. No.: 275,706

[22] Filed: Jun. 22, 1981

[30] Foreign Application Priority Data

Jun. 23, 1980 [JP] Japan .................................. 55-84760
Jun. 23, 1980 [JP] Japan .................................. 55-84761
Jun. 23, 1980 [JP] Japan .................................. 55-84762

[51] Int. Cl.³ ............................................. H04J 3/06
[52] U.S. Cl. ..................................... 370/104; 340/100
[58] Field of Search ........................ 370/104, 100, 105; 340/100 CS, 100 ST; 485/12, 13

[56] References Cited

U.S. PATENT DOCUMENTS

4,004,098  1/1977  Shimasaki ........................... 370/104
4,181,886  1/1980  Cooperman ................... 343/100 ST Primary Examiner—Gerald L. Brigance
Attorney, Agent, or Firm—Laff, Whitesel, Conte & Saret

[57] ABSTRACT

On carrying out communication among a plurality of earth stations by the use of a satellite, super-frame time slots are specified on board the satellite at a super-frame period equal to a frame period multiplied by a predetermined natural number in order to synchronize the satellite and the earth stations with the super-frame time slots. The satellite informs each earth station of the super-frame time slots by generating super-frame bursts specifying the super-frame time slots. Alternatively, each earth station generates super-frame bursts to enter the super-frame time slots on the satellite. The satellite informs such earth station of the super-frame time slots by preventing the super-frame bursts from being returned to each station. At any rate, the satellite and each station change one on-line sequence of operation to the other in synchronism with a specified one of the super-frame time slots without any interruption of communication.

9 Claims, 11 Drawing Figures

SATELLITE COMMUNICATION SYSTEM FOR SWITCHING FORMATS WITH REFERENCE TO SUPER-FRAME TIME SLOTS

BACKGROUND OF THE INVENTION

This invention relates to a satellite communication system of a space division multiple access-time division multiple access (abbreviated to "SDMA-TDMA" hereinafter) type and, in particular, to a method, a satellite circuit arrangement, and a synchronization circuit of an earth station for use in the SDMA-TDMA communication system. The SDMA-TDMA communication system, per se, is known and described in U.S. Pat. No. 3,928,804 (Schmidt, et al), U.S. Pat. No. 4,181,886 (Cooperman), or the like, and that the synchronization circuit is also known and described in U.S. Pat. No. 4,004,098 (Shimasaki).

In a satellite communication system of the type described, a satellite comprises a plurality of spot beam antennae which cover individual terrestrial zones, respectively. Each terrestrial zone comprises at least one earth station. The earth station or stations in each zone are for sending an up-link sequence of time division multiple access (TDMA) signals to the satellite and receiving a down-link sequence of TDMA signals from the satellite. Each TDMA signal of each down-link sequence includes down-link frame alignment bursts at a predetermined frame period.

The satellite comprises a memory for memorizing a switching format and for producing a sequence of switching signals in accordance with the memorized switching format. A switching matrix on board the satellite distributes the TDMA signals of the up-link sequences to the down-link sequences in accordance with the control signal sequence.

Sometimes, it happens that the switching format must be changed or switched to another switching format. The former format will be called a first switching format and the latter, a second switching format. In preparation for the change of formats, a satellite circuit arrangement disclosed in U.S. Pat. No. 4,181,886 issued to Richard S. Cooperman and assigned to Communications Satellite Corporation, comprises an additional memory for memorizing the second format in addition to the memory for memorizing the first switching format.

The second switching format is sent from a specific one of all earth stations to the additional memory, as a format specifying signal. The first and the second switching formats are switched from one to the other in response to a format switching command which is sent from the specific earth station to the satellite. The switching format selected by the command will be called an "on-line or active switching format" and the other, "a stand-by switching format."

Each of the transmitting and receiving sections of each earth station is put into operation in accordance with a station control format which is matched to the on-line switching format and which is peculiar to each earth station. During the time that the first switching format is used on board the satellite as the on-line switching format, the station control format should comply with the first switching format. As soon as the on-line switching format is switched to the second format, the station control format should be changed in each of the transmitting and the receiving sections to another station control format which is matched to the second switching format. Therefore, each earth station has to monitor the change on the satellite from one of the first and the second switching formats to the other. Otherwise, communication is objectionably interrupted.

A satellite is far from the earth surface. For example, a geostationary satellite is located at a distance of about 35,000 kilometers above the equator of the earth. A time division multiple access signal sent from an earth station returns to the earth station, under consideration, after a considerably long delay. The delay is usually longer than the frame period. The delay varies from a terrestrial zone to another and fluctuates dependent on movement of the satellite.

It is assumed that the switching and control formats are changed when a format switching command is received from a specific one of the earth stations to the satellite and the transmitting and receiving sections of each earth station. Inasmuch as the format switching command reaches the satellite and the earth stations with different timing, each of the switching and the control formats is individually and arbitrarily switched from one to another. It is difficult to concurrently change all of the switching formats and the control formats without any interruption of communication.

SUMMARY OF THE INVENTION

It is an object of this invention to provide a satellite communication method which is capable of switching formats of a satellite and earth stations without any interruption of communication.

It is another object of this invention to provide a circuit arrangement which is for use on board a satellite to carry out a method of a type described and which is capable of informing earth stations of a reference timing for switching the formats of the satellite and the earth stations.

It is another object of this invention to provide a synchronizing circuit which is for use in an earth station to carry out a method of the type described and which is capable of being synchronized with the reference timing informed from the satellite.

A method to which this invention is applicable is for carrying out communication among a plurality of terrestrial zones by the use of a satellite. Each terrestrial zone comprises at least one earth station. At at least one earth station is for sending an up-link sequence of time division multiple access signals to the satellite and for receiving a down-link sequence of time division multiple access signals returned from the satellite. One of the earth stations of the zones is for sending a format specifying signal and a format switching command to the satellite. The satellite comprises first memory means for memorizing a first switching format to produce a first sequence of switching signals, second memory means for memorizing a second switching format in response to the format specifying signal to produce a second sequence of switching signals, and means for generating frame pulses at a predetermined frame period. The method comprises the steps of: (a) selecting between the first and the second sequences at a time in response to the frame pulses and the command; (b) distributing the time division multiple access signals of each up-link sequence to the down-link sequences for the respective zones in compliance with the selected one of the first and the second sequences; and (c) interspersing a plurality of down-link frame alignment bursts in each time division multiple access signal of each down-link sequence, in synchronism with the frame pulses during distribution of the time division multiple access signals. The selecting, the distributing, and the interspersing steps are carried out on board the satellite.

According to this invention, the selecting step comprises the steps of (a) counting the frame pulses to a predetermined natural number in order to define super-frame time slots at a super-frame period which is equal to the frame period multiplied by the predetermined natural number and (b) switching the first and the second sequences from one to the other with reference to the super-frame time slots and the command. The interspersing step comprises the step of making each down-link sequence include information specifying to the super-frame time slots. The method comprises the step of making the earth station of the respective zones synchronize the time division multiple access signals of the respective up-link sequences during the super-frame time slots informed by the information included in the respective down-link sequences.

DESCRIPTION OF THE PREFERRED EMBODIMENTS

Referring to FIGS. 1 through 5, a satellite communication method, according to a first embodiment of this invention, is for use in carrying out communication among a plurality of terrestrial zones by the use of a satellite 20. Prior to describing the first embodiment, a description will be first made of a general time division multiple access-space division multiple access system, namely, a TDMA-SDMA system, for a better understanding of this invention.

Figure 1:
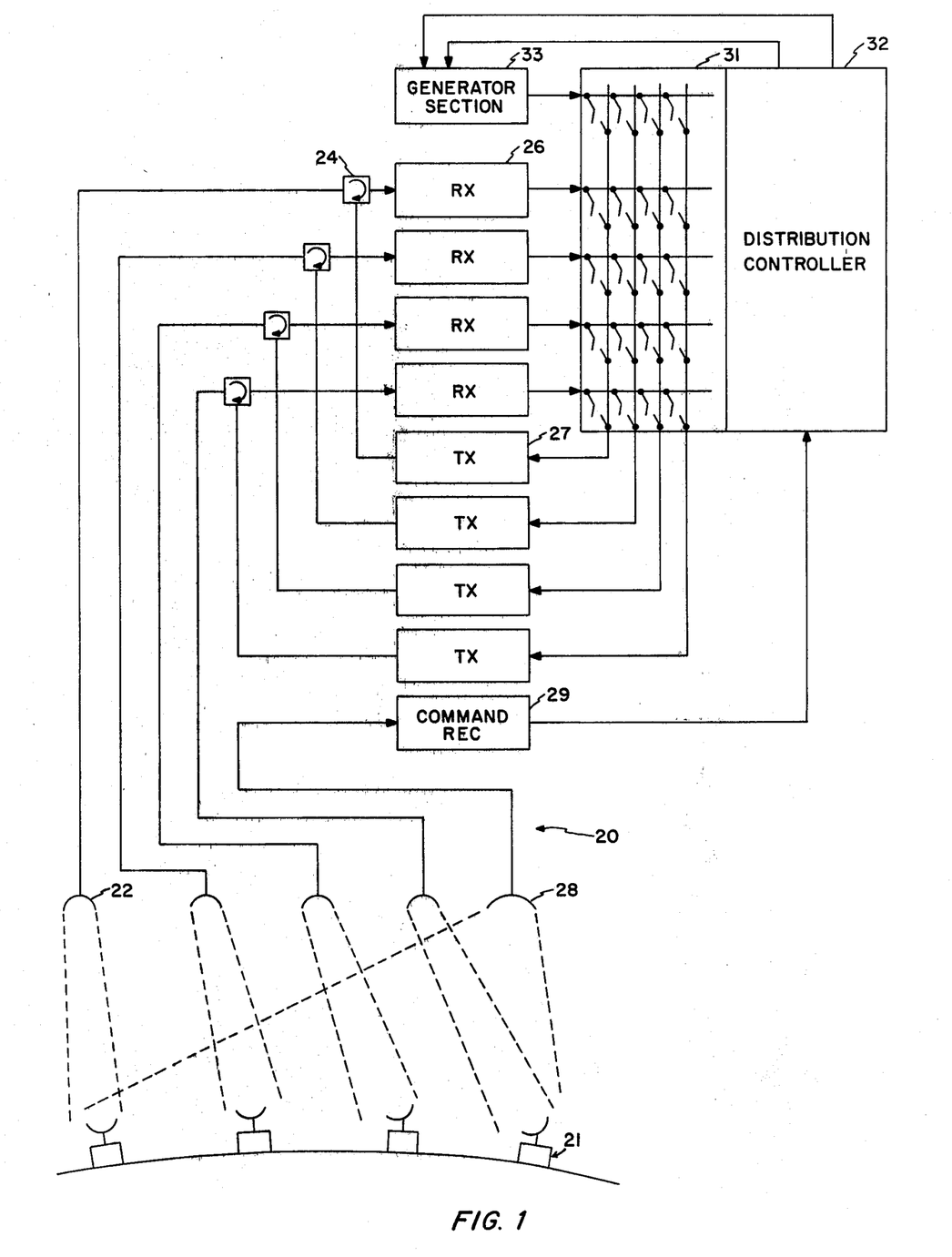
FIG. 1 shows a block diagram for describing a method and a circuit arrangement according to a first embodiment of this invention.

In each of the terrestrial zones, at least one earth station 21 is located to send an up-link sequence of time-division multiple access (TDMA) signals to the satellite 20 and to receive a down-link sequence of TDMA signals from the satellite 20. Each terrestrial zone may comprise a plurality of earth stations, although a single earth station is illustrated in FIG. 1.

It is known in the art that each of the earth stations 21 comprises transmitting and receiving sections, each section comprising a pair of station memories for memorizing a pair of station formats, respectively. Each earth station 21 is put into operation in accordance with either one of the station control format pair. One of the station control formats, in each section, may be called an "acting or on-line station control format" while the other, a "stand-by station control format." A specific one of the earth stations 21, which is called a "circuit control station," is for sending a sequence of commands to the satellite 20 and to the respective earth stations, to control them. The stand-by station control formats are also sent from the circuit control station to the respective earth stations through the satellite or the like.

The satellite 20 for the TDMA-SDMA system comprises a plurality of spot beam antennae 22 each of which is keenly directed to a preselected one of the terrestrial zones to cover the preselected zone alone. Each of the illustrated spot beam antennae 22 is commonly used to receive and transmit the TDMA signals. Each spot beam antenna 22 is coupled, through a circulator 24, to a receiver 26 and a transmitter 27 both of which are individually associated with a spot beam antenna 22. A pair of spot beam antennae for reception and transmission may be individually placed for each zone. A data command antenna 28 is on board the satellite 20 to receive the command sequence and a format specifying signal, to be described later, from the circuit control station and to deliver them to a command receiver 29.

A circuit arrangement on board the satellite 20 comprises a switching matrix 31 for distributing the time division multiple access signals of each up-link sequence to the down-link sequences under the control of a distribution controller 32 which will be described in detail with reference to FIG. 3. For the time being, it may be understood that the distribution controller 32 puts the switching matrix 31 into operation in accordance with a first switching format. When desired, the first switching format may be changed to a second switching format in response to a particular one of the commands, namely, a switching command, supplied from the circuit control station. The second switching format is specified by the format specifying signal supplied from the circuit control station.

The illustrated satellite 20 further comprises a generator section 33 for generating a sequence of frame synchronizing bursts at a predetermined frame period $T_s$ of, for example, 750 microseconds. Each of the frame alignment bursts defines a frame time slot and is interspersed in the TDMA signals of each down-link sequence. As will later be detailed with reference to FIG. 4, the generator section 33 further generates a plurality of super-frame bursts to specify or define super-frame time slots at a super-frame period $T_{sf}$, equal to the frame period multiplied by a predetermined natural number of, for example, 5. The super-frame period is longer than a delay time expected between the satellite 20 and each earth station 21 and is equal to several hundreds of milliseconds. The durations between two adjacent frame time slots and between two adjacent super-frame time slots are referred to simply as a "frame" and a "super-frame," respectively.

The method according to the first embodiment of this invention is for switching the first and the second switching formats from one to the other in the satellite 20 and the station control formats from the on-line format to the stand-by one. As shown in the time chart A of FIG. 2, the satellite 20 produces the frame alignment bursts (symbolized by shorter lines) and the super-frame bursts (symbolized by longer lines) to specify the frame $T_f$ and the super-frame $T_{sf}$, respectively.

Figure 2:
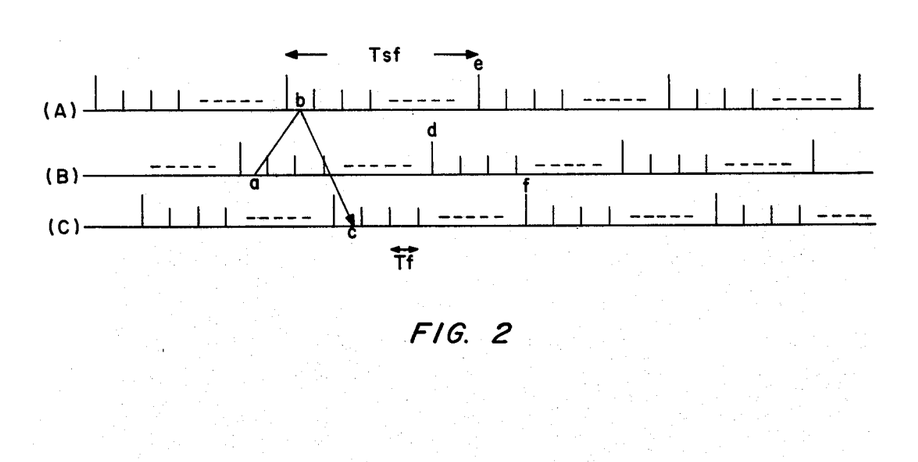
FIG. 2 shows a time chart for schematically describing a principle of the method according to the first embodiment of this invention.

The transmitting and receiving sections of a certain earth station, which is typical of all of the earth stations 21, are put into operation as exemplified by the time charts B and C, respectively. It is assumed that each of the transmitting and the receiving sections is synchronized with the frame and the super-frame bursts shown in A and that the respective stand-by formats are previously sent from the circuit control station to the transmitting and the receiving sections of each earth station 21 and the satellite 20.

Under the circumstances, let the switching command be given from the circuit control station to the earth station 21 and the satellite 20. The switching command is received at the satellite 20, the exemplified earth station 21, and the remaining earth stations during the same super-frame. In the first embodiment of this invention, each of the satellite 20 and the earth station 21 switches the respective formats from the on-line formats to the stand-by formats at a time point at which a particular one of the super-frame bursts is received after reception of the switching command. More particularly, the on-line station control format of the transmitting section of the earth station 21 is switched to the stand-by station control format at the beginning a of the super-frame which immediately follows the switching command. Subsequently, the on-line switching format is switched to the stand-by satellite one at the beginning b of the super-frame period defined on board the satellite 20. Likewise, the receiving section of the earth station 21 switches the formats from the on-line station format to the stand-by station one at the beginning c of the super-frame defined in the receiving section. Thus, switching is carried out in synchronism with the same super-frame bursts in the transmitting section, the satellite 20, and the receiving section. As a result, no intermittent interruption of communication takes place on switching the satellite and the station formats. This applies to communication between any other earth stations and the satellite 20.

Figure 3:
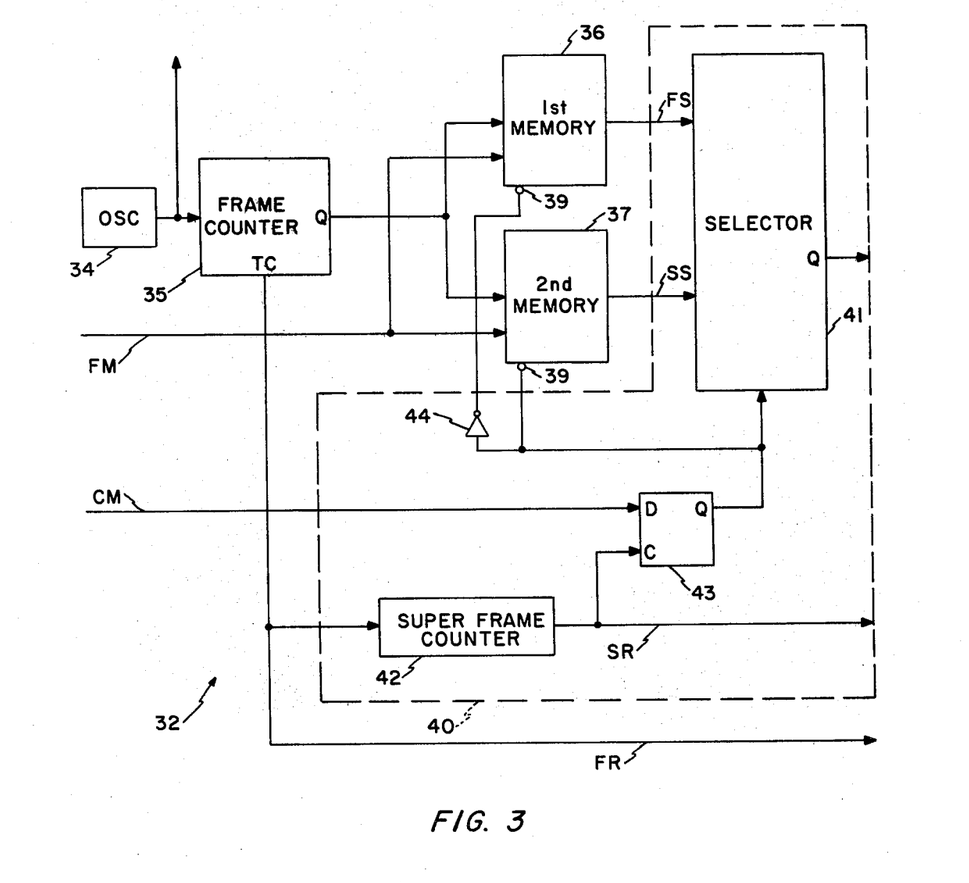
FIG. 3 shows a block diagram of a distribution controller illustrated in FIG. 1.

Referring to FIG. 3 together with FIG. 1, the distribution controller 32 comprises a clock generator 34 for generating a sequence of clock pulses at a clock rate, for example, 10 MHz and a frame counter 35 for counting the block pulses repeatedly to a preselected count determined by the number of information bursts within the frame. The frame counter 35 may be a flywheel counter having first and second output terminals Q and TC and serves as a decoder for decoding the counts into address signals ADR. The address signals ADR are supplied to the first and the second memories depicted at 36 and 37 through the first output terminal Q. The frame counter 35 further produces frame pulses FR through the second output terminal TC each time when the clock pulses are counted to the preselected count. Each frame pulse FR is generated at the beginning of the frame to specify each frame time slot. Therefore, the frame pulses FR appear one at the predetermined frame period.

The first memory 36 is for memorizing the first switching format and for producing a first sequence of switching signals FS. The second memory 37 is for memorizing the second satellite format to produce a second sequence of switching signals SS. Each of the first and the second memories 36 and 37 is supplied with the address signal ADR from the frame counter 35 and with the format specifying signal FM from the command receiver 29. Each of the first and the second memories 36 and 37 has a mode selecting terminal 39. When the mode selecting terminal 39 is given a logic "0" level, each memory is accessed by the address signal ADR to produce the switching signals from an address indicated by the address signal ADR. When the mode selecting terminal 39 is given a logic "1" level, each memory is capable of successively memorizing the format specifying signal FM at each address.

A selecting circuit 40 is coupled to the first and the second memories 36 and 37 and to the generator section 33. The selecting circuit 40 comprises a selector 41 for selecting one of the first and the second sequences at a time. A super-frame counter 42 is connected to the second output terminal TC to count the frame pulses FR to the predetermined natural number. As a result, the super-frame counter 42 produces a plurality of super-frame pulses SR at a super-frame period equal to the frame period multiplied by the natural number. Each of the super-frame pulses SR lasts during the leading frame of the super-frame. The super-frame pulses SR are supplied to a D-type flip flop 43 and to the reference generator section 33 illustrated in FIG. 1.

Coupled to the super-frame counter 42 and the command receiver 29, the D-type flip flop 43 produces a logic "1" level signal as a connecting control signal CC, because the command receiver 29 gives the D-type flip flop 43 a logic "1" level signal, as a command signal CM before reception of the switching command. Under the circumstances, the logic "0" level appears at the mode selecting terminal 39 of the first memory 36 through an inverter 44 while the logic "1" level appears at the terminal 39 of the second memory 37. Thus, the first memory 36 is put into operation in accordance with the address signal ADR supplied from the frame counter 35 to produce the first sequence of the switching signals FS. The selector 41 selects the first sequence FS when the connecting control signal CC takes the logic "1" level and, otherwise, selects the second sequence SS. Therefore, the first sequence FS is supplied through the selector 41 to the switching matrix 31 illustrated in FIG. 1 while the connection control signal CC takes the logic "1" level. In this state, the format specifying signal FM is capable of being memorized in the second memory 37 because the logic "1" level appears at the mode selecting terminal 39 of the second memory 37 as the connection control signal CC. Herein, let the second switching format be already memorized in the second memory 37.

Under the circumstances, it is presumed that the switching command is received at the command receiver 39 and the command signal CM takes the logic "0" level. The D-type flip flop 43 makes the connection control signal CC change the logic "1" level to the logic "0" level by one of the super-frame pulses SR following reception of the switching command CM. The change takes place near the leading edge of the above-mentioned one super-frame pulse SR. Consequently, the logic "0" level appears at the selector 41 and the mode selecting terminal 39 of the second memory 37 while the logic "1" level appears at the mode selecting terminal 39 of the first memory 36 through the inverter 44. Thus, the second memory 37 is put into operation in accordance with the address signal ADR to supply the switching matrix 31 with the second sequence SS through the selector 41. On the other hand, the first memory 36 is capable of receiving any other format specifying signal. Such a state continues until the next following switching command is received by the command receiver 29.

Figure 4:
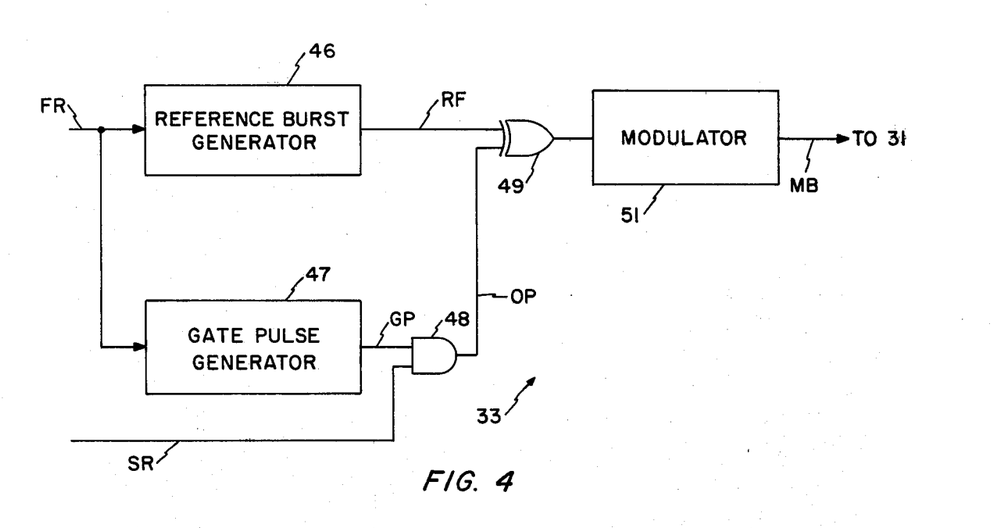
FIG. 4 shows a block diagram of a generator section illustrated in FIG. 1.
Figure 5:
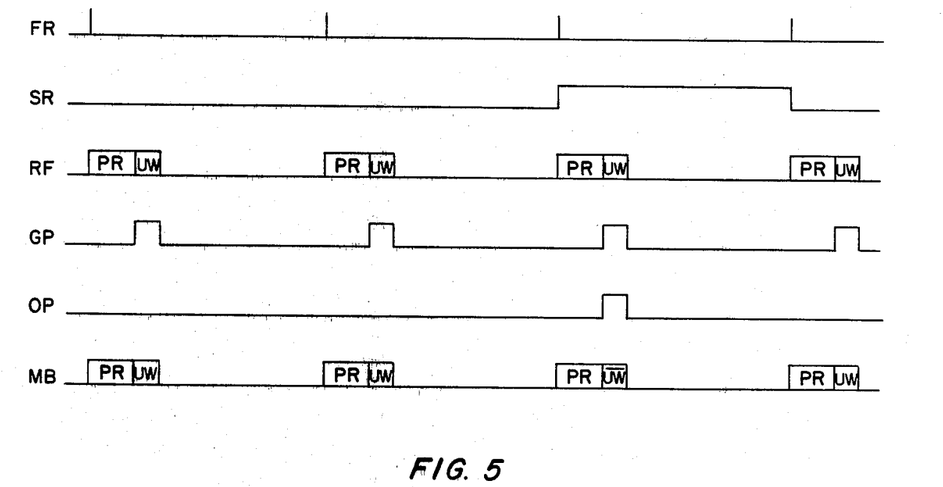
FIG. 5 shows a timing chart for describing an operation of the generator section illustrated in FIG. 4.

As shown in FIGS. 1, 4, and 5, the frame pulses FR and the super-frame pulses SR are supplied to the generator section 33. The generator section 33 comprises a reference burst generator 46 energized by each of the frame pulses FR for generating, at a frame period, a sequence of reference bursts as depicted by RF in FIG. 5. Each of the reference bursts RF is produced as a baseband signal and includes a preamble PR of, for example, 48 bits and a unique word UW of, for example, 20 bits. It is known in the art that the preamble PR is for carrier and symbol timing recovery while the unique word UW is for frame synchronization. For the purpose of brevity, the description will not dwell on the preamble in the first embodiment. Therefore, the unique word UW is called a "frame synchronizing burst" and a duration for the unique word UW is called a "frame time slot." In other words, the output of the reference burst generator 46 defines the frame time slot with reference to each of the frame pulses FR.

The reference burst generator 46 comprises a preamble generator for generating the preamble PR, a unique word generator for generating the unique word UW, a gate similar to a gate pulse generator 47 illustrated in FIG. 4, and a multiplexer for selecting one of the preamble PR and the unique word UW in response to output pulses of the gate. The output pulses of the gate are synchronized with the unique words UW and define the frame time slots at the frame period. As a result, the frame time slots are defined with reference to the frame pulses FR.

Responsive to the frame pulses FR, the gate pulse generator 47 generates a sequence of gate pulses as depicted by GP in FIG. 5. Each gate pulse GP is produced in synchronism with each unique word UW of the reference burst RF and lasts during each unique word UW. Supplied with the super-frame pulse SR and the gate pulses GP, an AND gate 48 produces output pulse OP only during presence of the gate pulses GP and the super-frame pulse SR. The output pulse OP appears at the super-frame period and specifies the super-frame time slot. Thus, the AND gate 48 coupled to the super-frame counter 42 is operated to specify specific time slots, namely, super-frame time slots at the super-frame period together with the gate pulse generator 47.

Coupled to the reference burst generator 46 and the AND gate 48, an Exclusive OR gate 49 produces super-frame bursts $\overline{UW}$ at the super-frame period. More specifically, the unique words UW or frame synchronizing bursts are delivered, kept intact, through the Exclusive OR gate 49 as they are during absence of the output pulse OP while the unique word UW is reversed in phase during presence of the output pulse OP. In other words, the logic "1" level and the logic "0" level are converted to the logic "0" level and the logic "1" level, respectively, during presence of the output pulse OP. Therefore, the Exclusive OR gate 49 converts those of the frame synchronizing bursts UW to the super-frame bursts $\overline{UW}$ which are produced at the super-frame time slots. In addition, the Exclusive OR gate 49 produces the remaining ones of the frame synchronizing bursts as remaining synchronizing bursts UW. Responsive to a burst combination of the super-frame bursts $\overline{UW}$ and the frame bursts UW, a modulator 51 produces a modulated burst signal MB.

Turning back to FIG. 1, the modulated burst signal MB is supplied to the switching matrix 31. The illustrated switching matrix 31 is controlled by the distribution controller 32 so that the modulated burst signal MB is distributed to all of the transmitters 27 during presence of each of the super-frame bursts $\overline{UW}$ and the frame synchronizing bursts UW, with each of the receivers 26 isolated from all of the transmitters 27. In other words, none of the TDMA signals of the up-like sequence is distributed to the respective down-link sequences during presence of each of the super-frame and the frame bursts. As a result, the frame synchronizing bursts UW are interspersed in each TDMA signal of each down-link sequence as the down-link frame alignment bursts while the super-frame bursts $\overline{UW}$, as information relating to the super-frame time slots.

This means that a part of the switching matrix 31 serves to intersperse the super-frame bursts $\overline{UW}$ during the super-frame time slots to inform, the earth stations of the respective zones, of the super-frame time slots.

Responsive to the super-frame bursts $\overline{UW}$ and the frame synchronizing bursts UW included in each down-like sequence, the earth station 21 first synchronizes its receiving and transmitting sections with the super-frame bursts $\overline{UW}$ and the frame synchronizing bursts UW by the use of a usual synchronizing circuit.

In a synchronized state, each of the receiving and the transmitting sections of each earth station is capable of switching the station control formats in each section from one to the other in synchronism with one of the super-frame time slots following reception of the switching command.

In the first embodiment, super-frame time slots may not be coincident with the frame time slots if the super-frame bursts are transmitted to all of the earth stations in the super-frame time slots together with the frame synchronizing bursts.

Figure 6:
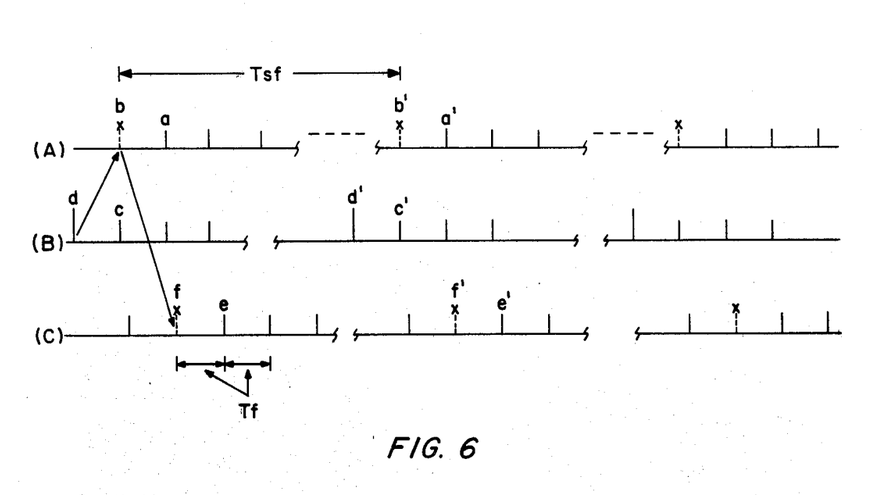
FIG. 6 shows a timing chart for schematically describing a principle of a method according to a second embodiment of this invention.

Referring to FIG. 6, a method according to a second embodiment of this invention will be described at first by the use of similar elements and signals designated by like reference numerals and symbols.

As shown by a, a'; and b, b' in the time chart A, frame time slots and super-frame time slots are determined on board a satellite 20 at the beginnings of frames $T_f$ and super-frames $T_{sf}$, respectively, as are the cases with the first embodiment. However, the satellite 20 itself produces neither frame alignment bursts nor super-frame bursts. Instead, each earth station 21 sends up-link frame alignment bursts c and c' and up-link super-frame bursts d and d' to the satellite 20, as shown in the time chart B, and monitors down-link frame alignment bursts e and e' sent back through the satellite 20, as shown in the time chart C. As depicted at C by dashed lines f and f', the satellite 20 does not send the up-link super-frame bursts d and d' back to the earth station 21, under consideration. That is, information relating to the super-frame time slots is transmitted to the earth station 21 as an absence of down-link frame alignment bursts during two frame periods. Merely for convenience of description, such information may be referred to as "down-link super-frame bursts" f and f'. Responsive to the down-link frame alignment bursts and the down-link super-frame bursts, each earth station 21 detects the frame time slots and the super-frame time slots defined on board the satellite 20 to synchronize its receiving and transmitting sections with the frame and the super-frame time slots.

More particularly, the transmitting section of each earth station generates up-link frame bursts c and c' and up-link super-frame bursts d and d'. It is assumed for brevity of description that the frame and the super-frame bursts in the transmitting section of the earth station are already synchronized with those defined on board the satellite. In this case, the super-frame bursts d and d' are received at the satellite 20 during the super-frame time slots b and b' and are not returned to the receiving section of the earth station 21, as shown by f and f' in the time chart C. On the other hand, the up-link frame bursts c and c' are received at the satellite 20 during the frame time slots a and a' and returned to the receiving section as the down-link frame bursts e and e'.

With this method also, it is possible to switch the respective formats in the satellite and the transmitting and the receiving sections of each earth station from one to the other without any interruption of communication.

Figure 7:
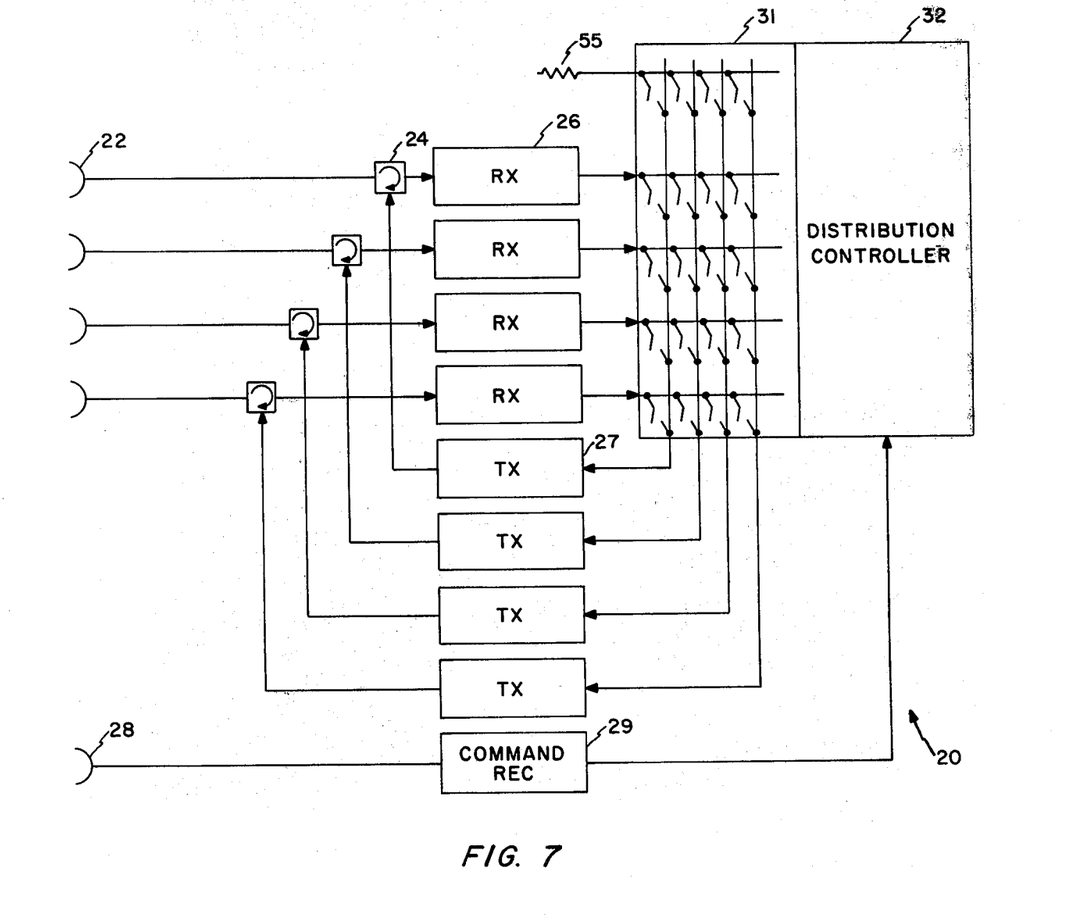
FIG. 7 shows a block diagram of a satellite circuit arrangement according to the second embodiment of this invention.
Figure 8:
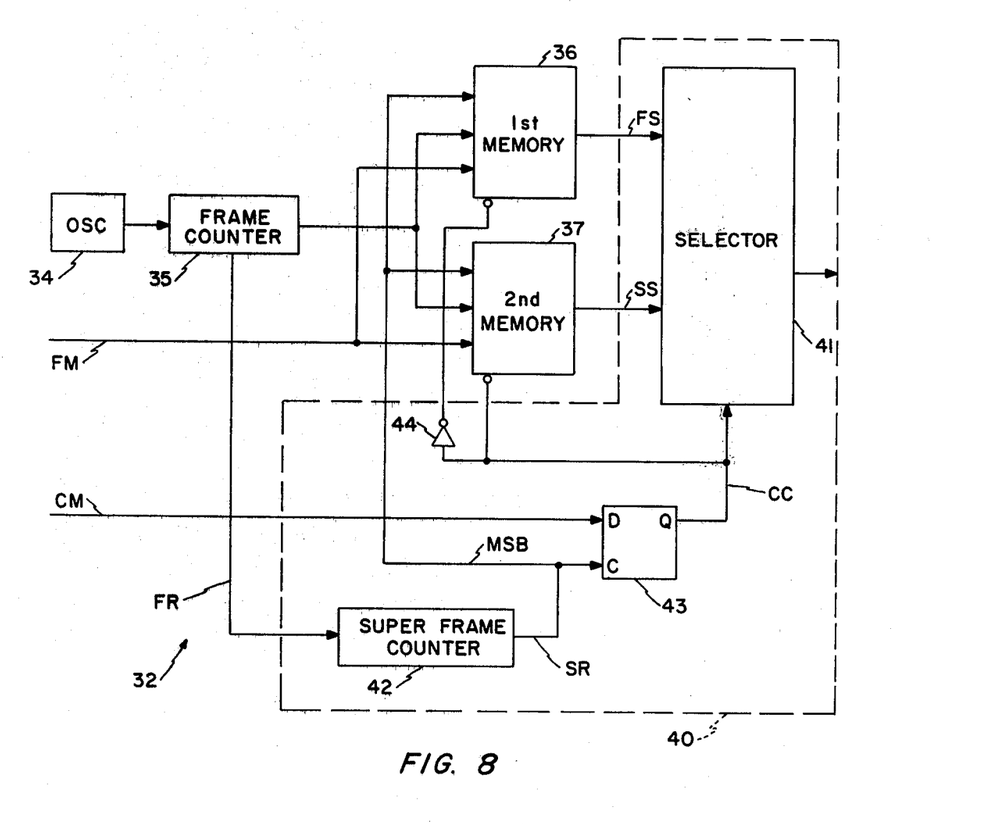
FIG. 8 shows a block diagram of a distribution controller illustrated in FIG. 7.

Referring to FIGS. 7 and 8, a circuit arrangement for use in carrying out the method according to the second embodiment of this invention is for use on board a satellite 20 and is similar to that illustrated with reference to FIG. 1 except that a dummy load 55 is coupled to the switching matrix 31 instead of the generator section 33, detailed with reference to FIGS. 4 and 5, and that a distribution controller 32 shown in FIG. 8 supplies the dummy load 55 with none of the frame pulses FR and the super-frame pulses SR shown in FIGS. 1, 4, and 5.

In FIG. 8, the distribution controller 32 comprises similar parts and signals designated by like reference numerals and symbols, as in FIGS. 4 and 5. As in FIG. 3, the frame counter 35 supplies the first and the second memories 36 and 37 with a sequence of address signals ADR at a clock rate of, for example, 10 MHz, and the super-frame counter 42 with the frame pulses FR at the frame period.

Responsive to the frame pulses FR, the super-frame counter 42 produces the super-frame pulses SR at the super-frame period, as is the case with that illustrated in FIG. 3. Each of the super-frame pulses SR lasts during the leading frame of the super-frame and is supplied to the first and the second memories 36 and 37 to serve as the most significant bit MSB of each address signal ADR.

Let each of the first and the second memories 36 and 37 have a capacity of sixteen words. In this case, each address of the first and the second memories 36 and 37 is specified by the address signals ADR of four bits. The most significant bit MSB takes the logic "1" level during presence of each super-frame pulse SR and, otherwise, takes the logic "0" level. Therefore, the switching signals FS or SS are read out from a first group of addresses "1000" through "1111" during presence of each super-frame pulse SR while they are read out from a second group of addresses "0000" through "0111" during absence of the super-frame pulses SR. Thus, the leading frame of the super-frame can be distinguished or specified from the remaining frames.

The first and the second memories 36 and 37 selectively produce first and second sequences FS and SS of switching signals in response to the address signals ADR. A first one of the switching signals in each sequence is read out from either one of the memories 36 and 37 at the frame period as long as the super-frame pulses SR are absent. The first switching signal, therefore, appears in response to one of the first group of the address signals ADR to specify a synchronizing window (to be latter described) including the frame time slot. Therefore, the first switching signal lasts during the synchronizing window. A second one of the switching signals in each sequence is read out at the super-frame period in response to one of the second group of the address signals ADR. The second switching signal lasts during the super-frame time slot included in the synchronizing window. Thus, the synchronizing window includes either the frame time slot or the super-frame time slot and is for accommodating the frame synchronizing burst or the super-frame burst together with the preamble, as illustrated with reference to FIG. 5.

Under the circumstances, it may be said that the super-frame counter 42 serves to specify the super-frame time slots, cooperating with the frame counter 35 and the memories 36 and 37.

Referring to FIG. 7 again, the switching matrix 31 connects the respective receivers 26 to the dummy load 55 in response to the second switching signal. As a result, the TDMA signals of each up-link sequence are not distributed to the respective down-link sequences through the switching matrix 31 during the super-frame time slot. Thus, a part of the switching matrix 31 is operatively coupled to the super-frame counter 42, the dummy load 55, and the respective receivers 26 to bypass the TDMA signals of each up-link sequence to the dummy load 55.

During the super-frame time slot, each of the transmitters 27 produces none of the TDMA signals of each down-link sequence. Therefore, each of the super-frame time slots is specified by the absence of the TDMA signals of each down-link sequence and is sent to the earth stations of each terrestrial zone. This means that each transmitter 27 serves to derive each down-link sequence specifying the super-frame time slots in cooperation with the switching matrix 31.

In the remaining frames of the super-frame except the leading frame, the remaining synchronizing windows are opened to define the frame time slots in cooperation with the switching matrix 31 and the distribution controller 32, as described by Nobuhiko Shimasaki et al in U.S. Pat. No. 3,789,142. During the remaining synchronizing windows, each of the receivers 26 is connected to the corresponding transmitter 27 which uses one of the single spot beam antenna 22 in common. Therefore, the frame alignment bursts from each earth station are returned to the same earth station during the frame time slots.

In addition, the TDMA signals of each up-link sequence are distributed to the respective down-link sequences except for the super-frame time slot and the synchronizing windows in a usual manner.

Although each of the super-frame pulses SR lasts during a whole leading frame of the super-frame, each of the super-frame pulses may be produced only during each super-frame time slot. In this case, a decoder is connected between the super-frame counter 42 and the memories.

In FIG. 8, the command signal CM is kept at the logic "1" level by a register (not shown) of the command receiver 29 before the command receiver 29 receives the switching command. As a result, the D-type flip flop 43 produces the logic "1" level as the connecting control signal CC. Under the circumstances, the first sequences FS of switching signals is read out from the first memory 36 in accordance with the first satellite format and fed through the selector 41 to the switching matrix 31 at present. On the other hand, the second memory 37 is responsive to the format specifying signal to memorize the second satellite format during reading operation of the first memory 36.

When the switching command is received by the command receiver 29, the command signal CM takes the logic "0" level. The D-type flip flop 43 produces the logic "0" level as the connecting control signal CC after one of the super-frame pulses SR is received following reception of the switching command. As a result, the first memory 36 is switched to the second memory 37 in synchronism with the one super-frame pulse SR following the switching command.

Figure 9:
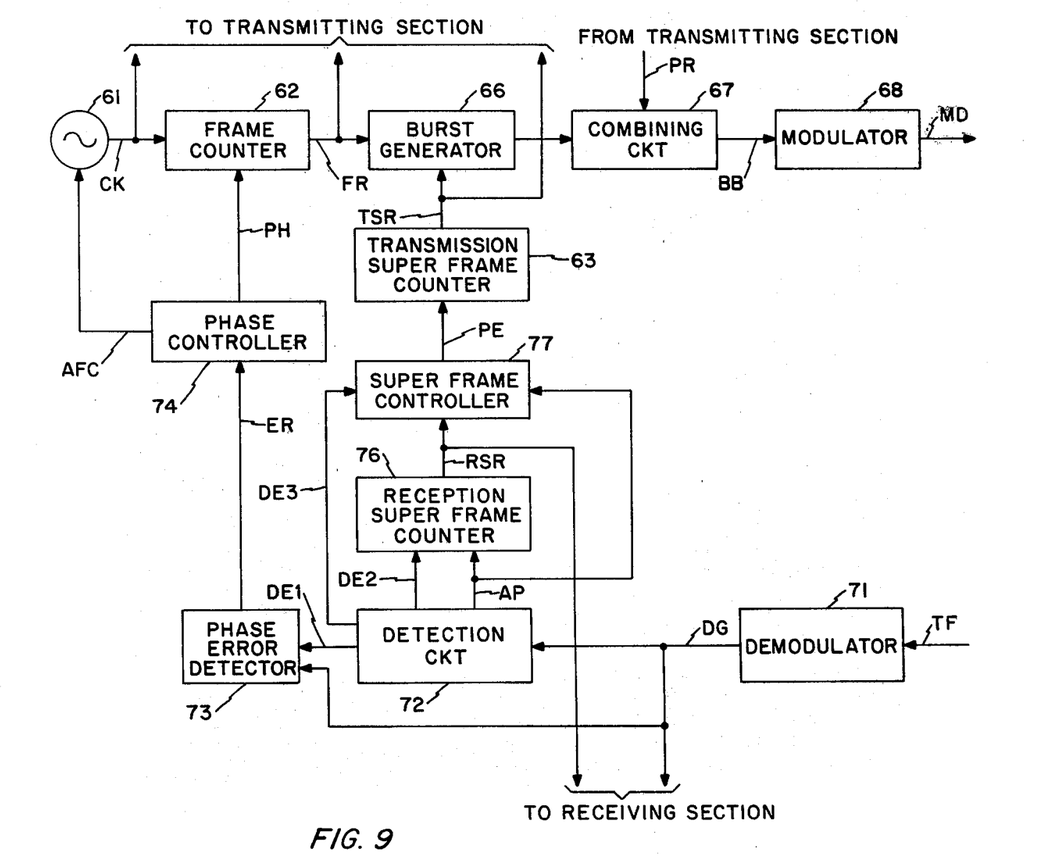
FIG. 9 shows a block diagram of a synchronization circuit of an earth station according to the second embodiment of this invention.

Referring to FIG. 9, a synchronization circuit is provided for use in each of the earth stations 21 (FIG. 1) in carrying out a satellite communication method illustrated with reference to FIGS. 6 through 8. The earth station comprises transmitting and receiving sections (not shown), which may be of the type described in U.S. Pat. No. 3,812,430, issued to William G. Schmidt et al, assigned to Communications Satellite Cooperation. The transmitting section produces preambles PR (FIG. 5). As described before, the satellite 20 (FIG. 7) specifies synchronizing windows comprising the super-frame time slots and the frame time slots. The circuit control station sends format specifying signals to the earth station under consideration either via the satellite 20 or through a terrestrial channel. The format switching command is also supplied to the earth station in question.

Briefly speaking, the synchronization circuit is for producing an intermittent sequence of transmission frame alignment bursts generally at the frame period and an intermittent sequence of transmission super-frame bursts at the super-frame period and for transmitting the transmission frame alignment and super-frame bursts as the up-link frame alignment bursts c and c' (FIG. 6) and the up-link super-frame bursts d and d' so that the bursts, such as c and d, may reach the satellite 20 in coincidence with the frame time slots a and a' and the super-frame time slots b and b', respectively. With the synchronization circuit, it is possible to make the format switching command produce format switching signals in timed relation to one of the super-frame time slots for use in switching the station control formats from one to the other in the transmitting and the receiving sections.

The synchronization circuit comprises an oscillator 61 for generating a sequence of synchronization circuit clock pulses CK at the clock rate of the oscillator 34. A frame counter 62 divides the clock pulses CK to produce an intermittent sequence of frame pulses FR at the frame period of the frame counter 35. In order to carry out frame synchronization, the clock rate of the clock pulses CK and the phase of the frame pulses FR are temporarily controlled by an automatic frequency control signal AFC and a phase control signal PH as will presently be described. A transmission super-frame counter 63 produces an intermittent sequence of transmission super-frame pulses TSR at the super-frame period, as will later be described. Each of the frame pulses FR and the super-frame pulses TSR lasts during one synchronizing window. The clocks CK, the frame pulses FR, and the super-frame pulses TSR are supplied to the transmitting section. Incidentally, the super-frame period is longer than the time required for the return travel of the time division multiple access signals.

Responsive to the frame pulses FR and the super-frame pulses TSR, a burst generator 66 generates the transmission super-frame pulses. During absence of the super-frame pulses TSR, the burst generator 66 generates the transmission frame alignment bursts. Each frame alignment burst specifies a unique word UW (FIG. 5). Each super-frame burst defines an antiphase unique word $\overline{UW}$. The preamble PR, the frame alignment bursts, and the super-frame bursts are supplied to a combining circuit 67 for producing a baseband signal BB, which is modulated by a modulator 68 into a modulated signal MD of the type described in conjunction with FIG. 5 as the modulated burst signal MB. The modulated signal MD is transmitted to the satellite 20 through the transmitting section and the antenna (FIG. 1) and comprises the transmission frame alignment and super-frame bursts as the up-link frame alignment and super-frame bursts. The frame alignment and the super-frame burst will generally be designated by (UW) and $(\overline{UW})$, respectively.

As described with reference to FIGS. 6 through 8, the satellite 20 prevent the super-frame bursts $(\overline{UW})$ from returning to the earth station. The illustrated synchronization circuit sends the frame alignment bursts (UW) back thereto if the up-link frame alignment and super-frame bursts reach the satellite 20 in coincidence with the frame time slots and the super-frame time slots, such as a and b, respectively. Such a coincident state will be called a "synchronous state."

If one of the up-link super-frame bursts $(\overline{UW})$ arrives at the satellite 20 incoincident with a certain one of the super-frame time slots b and b', one of the up-link frame alignment bursts (UW) will be suppressed by the satellite 20 and will not return to the synchronization circuit as one of the down-link frame alignment bursts. Instead, the up-link super-frame bursts will erroneously return to the synchronization circuit as down-link super-frame bursts. Such an incoincident state will be named as asynchronous state.

Depending on the circumstances, it may happen that each of the up-link super-frame bursts $(\overline{UW})$ and frame alignment bursts (UW) is only partially sent by the satellite 20 back to the synchronization circuit as a partial down-link frame alignment burst. It is possible in such a case to adjust the phase of the down-link frame alignment bursts on the satellite 20 in the manner known in the art. Consequently, the description will mainly be directed to the synchronous and the asynchronous states in the following.

In FIG. 9, a demodulator 71 is supplied with an intermediate frequency signal IF from the receiving section. Through a high frequency amplifier and a frequency converter of the receiving section, the intermediate frequency signal IF is derived from the time division multiple access signals of the down-link sequence received by the antenna (FIG. 1) of the earth station comprising the illustrated synchronization circuit. The demodulator 71 demodulates the intermediate frequency signal IF into a sequence of digital signals DG, which are supplied to the receiving section. In the synchronous state, the digital signals DG include reception frame alignment bursts (UW) and none of reception super-frame bursts $(\overline{UW})$ derived from the down-link frame alignment bursts. The digital signals DG furthermore include preambles. Only in the asynchronous state, the digital signals DG include reception super-frame bursts ($\overline{UW}$) derived from the down-link super-frame bursts.

The digital signals DG are supplied also to a detection circuit 72 comprising a pattern detector, an aperture generator, and a frame counter, all of which are known in the art and are therefore not shown. Responsive to the digital signals DG, the pattern generator produces a first sequence of detection pulses DE1. Each first sequence detection pulse DE1 is produced after detection of each preamble and lasts for a duration equal to the synchronizing window.

The digital signals DG are supplied furthermore to a phase error detector 73. Supplied also with the first detection pulse sequence DE1, the phase error detector 73 detects a phase difference between the synchronizing windows and the digital signals DG to produce a phase error signal ER representative of the phase difference. When the phase error signal ER indicates a presence of any phase error, a phase controller 74 delivers the automatic frequency control signal AFC and the phase control signal PH to the oscillator 61 and the frame counter 62.

Responsive to the digital signals DB, the aperture generator of the detection circuit 72 produces a sequence of aperture pulses AP defining apertures for the reception frame alignment bursts (UW) and super-frame bursts ($\overline{UW}$). The aperture generator keeps production of the aperture pulses AP even when the reception frame alignment bursts (UW) are lost in the digital signals DG during a certain number of frame periods.

The detection circuit 72 produces a sequence of second detection pulses DE2 when neither the frame bursts (UW) nor the super-frame bursts ($\overline{UW}$) are detected during presence of the aperture pulses AP at the pattern detector. A production of the second detection pulses DE2 means that the super-frame bursts sent to the satellite are coincident with the super-frame time slots on board the satellite. The second detection pulses DE2 may be referred to as "synchronism" indicating "pulses" hereinunder.

When the super-frame bursts $\overline{UW}$ are detected by the pattern detector during presence of the aperture pulses AP, the detection circuit 72 produces a sequence of third detection pulses DE2 representative of detection of the super-frame bursts UW. A production of the third detection pulses DE3 means that the super-frame bursts $\overline{UW}$ sent to the satellite are returned to the earth station and that the sent super-frame bursts $\overline{UW}$ are not coincident with the super-frame time slots defined on board the satellite.

The second detection pulses DE2 are supplied to a reception super-frame counter section 76 while the third detection pulses DE3, to a super-frame controller 77. The aperture pulses AP are delivered to both of the reception super-frame counter section 76 and the super-frame controller 77.

Figure 10:
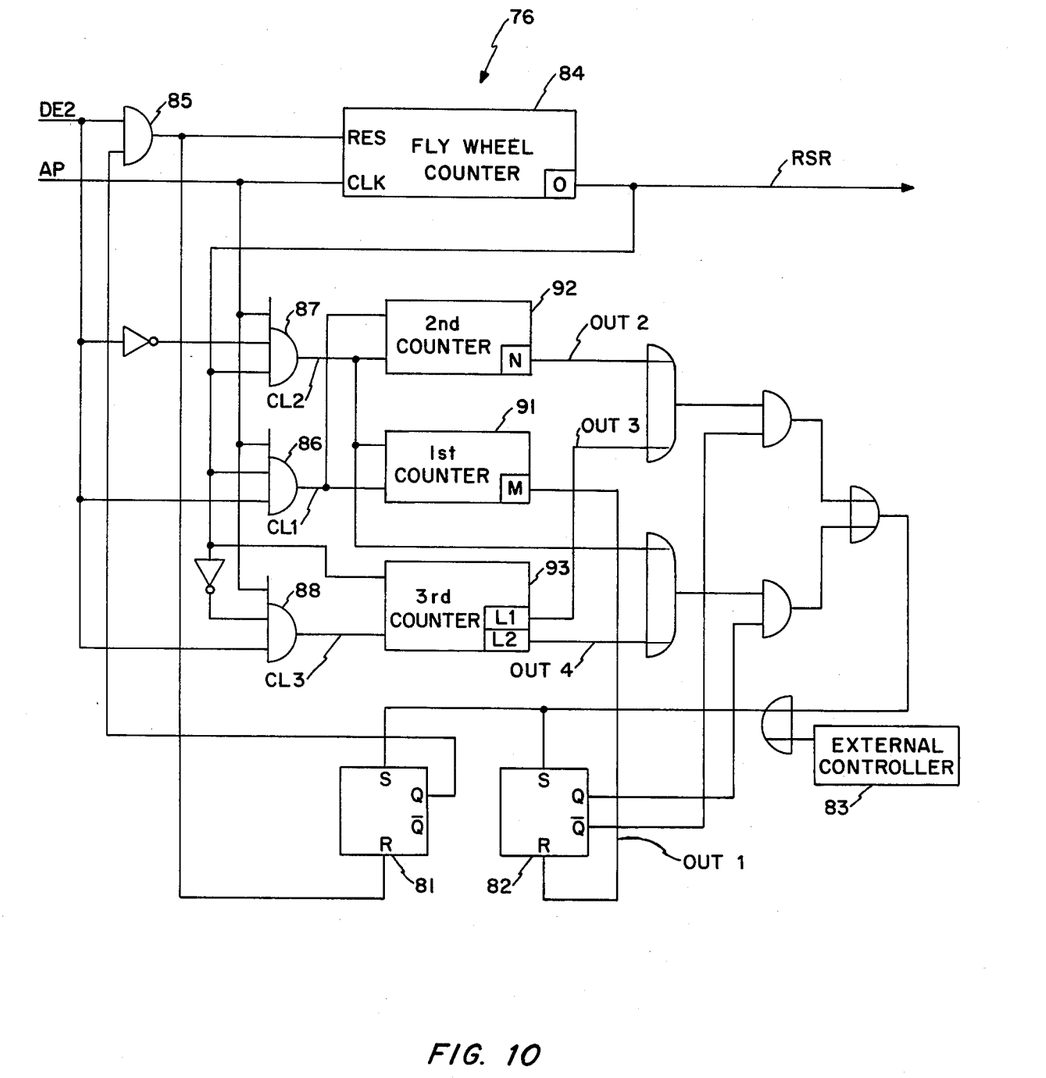
FIG. 10 shows a block diagram of a reception super-frame counter section illustrated in FIG. 9.

Referring to FIG. 9 again and to FIG. 10 anew, the reception super-frame counter section 76 comprises first and second flip flops 81 and 82 each of which is initially kept at a set state by an external controller 83. In this state, the counter section 76 is asynchronous to the super-frame time slots on board the satellite. A reset state of the first flip flop 81 alone is representative of a transient state of the counter section 76 while the reset states of both flip flops 81 and 82, a synchronous state.

During the asynchronous state, the aperture pulses AP are supplied as clock pulses to a flywheel counter 84 which is countable to the predetermined natural number. Under the circumstances, when one of the second detection pulses DE2 is sent to the counter 84 through an AND gate 85, the counter 84 is reset once into a predetermined number, for example, 0. At the same time, the first flip flop 81 is reset to close the AND gate 85.

As a result, the counter section 76 is turned to the transient state. During the transient state, the flywheel counter 84 is turned into the reset state and produces a reception super-frame pulse RSR each time when the aperture pulses AP are counted to the predetermined natural number. The reception super-frame pulse RSR appears at a time point at which a super-frame period elapses after the second detection pulse DE2 is first supplied to the counter 84. In other words, the reception super-frame pulse RSR is produced at the time point when the reception of the next following second detection pulse DE2 is expected. The time point may be called "super-frame expectation point."

The reception super-frame pulse RSR is supplied from the counter 84 to first, second, and third AND gates 86, 87, and 88. The first AND gate 86 is enabled to produce a second clock pulse CL1 when the next following second detection pulse DE2 appears during presence of the reception super-frame pulse RSR. Therefore, the first clock pulse CL1 is produced when the sent super-frame bursts are twice coincident with the super-frame time slots. A first counter 91 counts the first clock pulse CL1 to produce an output signal OUT1 when the first clock pulse CL1 is counted to a first preselected number M. Thus, the output signal OUT1 is produced when the second detection pulse DE2 is received M-times at the super-frame expectation time point. In other words, the super-frame expectation point is coincident with the super-frame time slot M-times and may, therefore, be considered to be synchronized with the super-frame time slot. Responsive to the output signal OUT1, the second flip flop 82 is switched to the reset state. Consequently, the reception counter section 76 reaches the synchronous state. The second AND gate 87 is enabled to produce a second clock pulse CL2 when the next following second detection pulse DE2 does not appear during the reception super-frame pulse RSR and the aperture pulse AP.

The second clock pulse CL2 is produced when the super-frame burst sent from the earth station is not coincident at the super-frame expectation point with the super-frame time slot defined on board the satellite. The second clock pulse CL2 is counted at a second counter 92. The second counter 92 produces an output signal OUT2 when the count reaches a second preselected number N. The production of the output signal OUT2 means that the second detection pulse DE2 does not appear N-times at the super-frame expectation point. In this case, the reception super-frame counter section 76 should return to the asynchronous state. Therefore, the output signal OUT2 is sent through OR gates and AND gates (unnumbered) to the first flip flop 81 to set the same. As a result, the reception super-frame counter 76 returns from the provisional synchronous state to the asynchronous state.

The third AND gate 88 produces a third clock pulse CL3 when the second detection pulse DE2 is detected at a time point except the super-frame expectation point. Responsive to the third clock pulse CL3, a third counter 93 counts the third clock pulse CL3 to a third preselected number L0 during the transient synchronous state and to a fourth preselected number during the synchronous state. The third counter 93 produces output signals OUT3 and OUT4 when the count exceeds the third and the fourth predetermined numbers L0 and L1, respectively. Responsive to the third and the fourth output signals OUT3 and OUT4, the first and the second flip flops 81 and 82 are switched to the set states. Thus, the reception super-frame counter 76 is switched from the transient synchronous state or the synchronous state to the asynchronous state.

The reception super-frame counter 76 is capable of detecting the frame time slots f and f' illustrated in FIG. 6 in the above-mentioned manner. The reception super-frame pulse RSR sent to the receiving section is used as a switching signal for switching the station control formats in the receiving section from an on-line one to a stand-by one.

Figure 11:
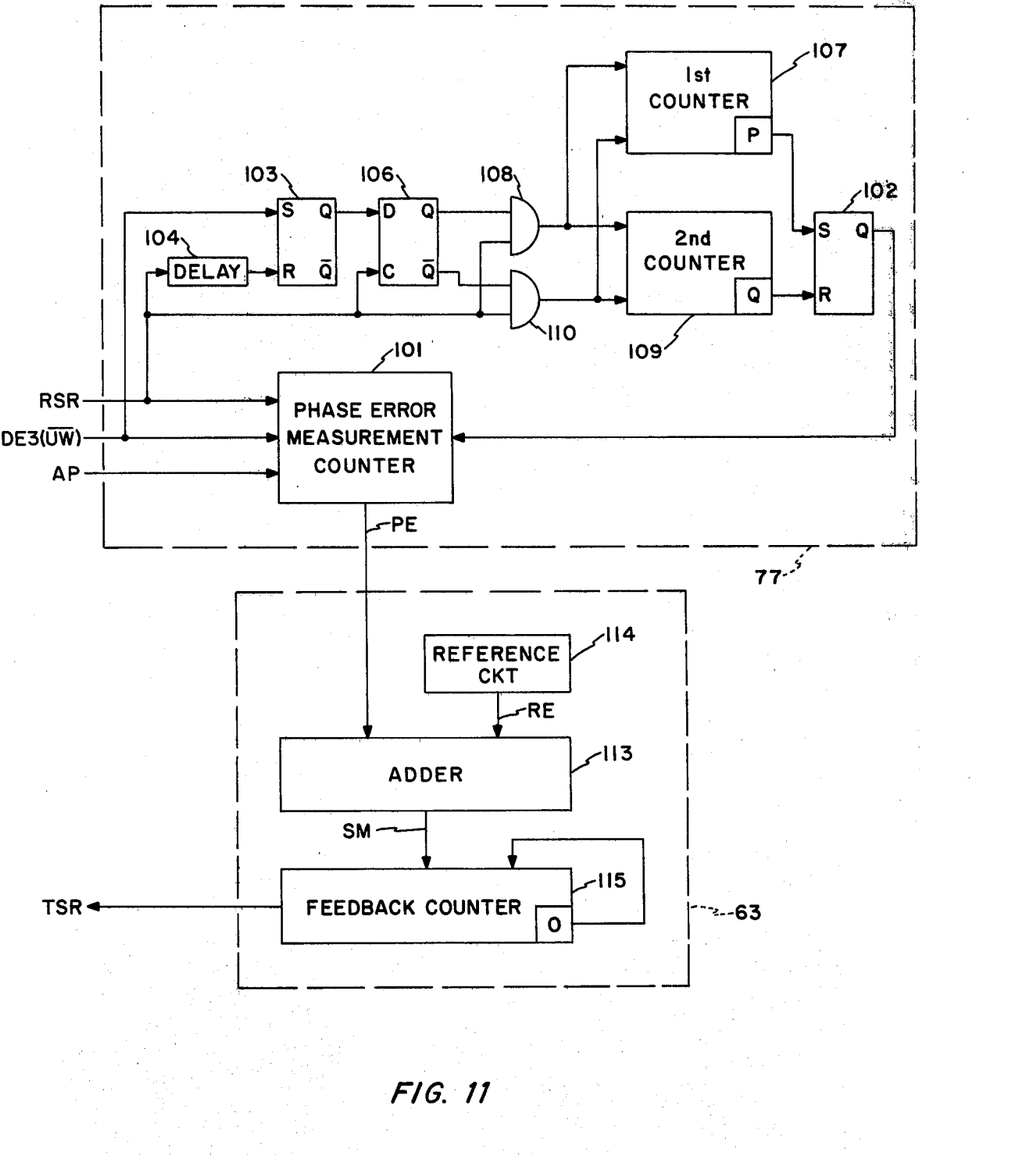
FIG. 11 shows a block diagram of a super-frame controller and a transmission super-frame counter section, both being illustrated in FIG. 9.

Referring to FIG. 11, the super-frame phase controller 77 is operable in either of the synchronous and the asynchronous states. The controller 77 comprises a phase error measurement counter 101 responsive to the local or reception super-frame pulse RSR and the third detection pulse ($\overline{UW}$) DE3 for measuring a difference of time between the reception super-frame pulse RSR and the third detection pulse DE3. The difference is represented by the number of the aperture pulses AP received from the detection circuit 72 and is sent from the counter 101 to the transmission super-frame counter 63 as a phase error signal PE representative of the number. The phase error signal PE lasts during one super-frame period and the next following phase error signal is produced after a delay of more than 0.3 second.

The super-frame phase controller 77 comprises a flip flop 102 which is set during the asynchronous state and reset during the synchronous state. The flip flop 102 energizes the phase error counter 101 only during the asynchronous state and, otherwise, deenergizes it. Therefore, the phase error counter 101 produces the phase error signal PE only during the asynchronous state.

In the illustrated super-frame phase controller 77, the third detection pulse DE3 is supplied to a flip flop 103. The flip flop 103 is set by the third selection pulse DE3 and reset by the reception super-frame pulse RSR delayed by a delay circuit 104. As a result, a D-type flip flop 106 is set at a leading edge of the reception super-frame pulse RSR and is kept during presence of the reception super-frame RSR, namely, one frame duration.

When the flip flop 106 is set, a first counter 107 is counted up via a first AND gate 108 in response to the reception super-frame pulse RSR with a second counter 109 reset.

On the other hand, when the third detection pulse DE3 does not appear during presence of the reception super-frame pulse RSR, the second counter 109 is counted up via a second AND gate 110 in response to the reception super-frame pulse RSR with the first counter 107 reset.

Thus, the first and the second counters 107 and 109 are cyclically countable to prescribed numbers or values P and Q, respectively, in response to the reception super-frame pulse RSR and the third detection pulse DE3.

More particularly, if the third detection pulse DE3 does not appear Q times, the second counter 109 resets the flip flop 102 to deenergize the phase error measurement counter 101. As a result, the reception super-frame controller 77 is switched to the synchronous state.

If the third detection pulse DE3 appears P times, the first counter 107 sets the flip flop 102 to energize the phase error counter 101. Inasmuch as the super-frame controller 77 becomes the asynchronous state, the phase error counter 101 begins to measure the difference of time between the third detection pulse DE3 and the reception super-frame pulse RSR.

As illustrated in detail in FIG. 11, the transmission super-frame counter section 63 comprises an adder 113 energized by the phase error signal PE. The adder 13 is supplied from a reference circuit 114 with a reference signal representative of a reference value. The reference value is equal to the number of the aperture pulses AP produced during one super-frame period.

Let it now be assumed that the value of the difference and the reference value be equal to X and Y, respectively. The adder 113 sums up the values X and Y to produce a sum signal SM representative of the sum of X and Y. Responsive to the sum signal SM, a feedback counter 115 is counted down at the frame period to produce each transmission super-frame pulse TSR when the count becomes equal to zero. Inasmuch as the feedback counter 115 is counted down at the frame period, the transmission super-frame pulse TSR is delayed by X frames during presence of the value X of the difference. An extension is, therefore, possible for a duration or super-frame between the transmission super-frame pulse TSR and the preceding one super-frame pulse. Thus, the transmission super-frame pulse TSR is adjusted in phase by the feedback counter 115 so that the up-link super-frame bursts ($\overline{UW}$) may reach the satellite 20 in coincidence with the super-frame time slots, such as b.

When the phase-adjusted transmission super-frame pulse TSR is sent to the burst generator 66 to produce the super-frame burst, the next following third detection pulse DE3 is not detected because the reception super-frame pulse RSR coincides with a detecting timing of the next following third detection pulse DE3.

The transmission super-frame counter 63 and the burst generator 66 serve to time the super-frame bursts in accordance with the phase-adjusted transmission super-frame pulse to make the super-frame bursts coincide with the super-frame time slots. The transmission super-frame pulse TSR supplied to the transmitting section is used to switch the station control formats from one to the other in that section.

While this invention has thus far been described in conjunction with a few embodiments thereof, it will be readily possible for those skilled in the art to put this invention into practice in various manners. Although, in the first and the second embodiments, each of the super-frame bursts is specified by reversing the phase of the frame synchronizing burst, it is possible to specify each of the super-frame bursts by more intricate modulation. For example, when every other frame burst is in phase with each of the remaining frame bursts modulated into an antiphase, an arrangement including the super-frame burst is specified by further modulating two adjacent super-frame bursts. In order to specify the super-frame burst, a use is possible of a particular pattern different from that of the frame burst. A microprocessor may be substituted for a combination of the reception super-frame counter 76, the super-frame controller 77, and the transmission super-frame counter 77, all of which are illustrated in FIGS. 9, 10, and 11.

What is claimed is:

1. In a satellite communication method of carrying out communication among a plurality of terrestrial zones by the use of a satellite, each terrestrial zone comprising at least one earth station, said at least one earth station being for sending an up-link sequence of time division multiple access signals to said satellite and receiving a down-link sequence of time division multiple access signals from said satellite, one of the earth stations of said zones being for sending a format specifying signal and a format switching command to said satellite, said satellite comprising first memory means for memorizing a first switching format to produce a first sequence of switching signals, second memory means for memorizing a second switching format in response to said format specifying signal to produce a second sequence of switching signals, and means for generating frame pulses at a predetermined frame period, said method comprising the steps of selecting one of said first and said second sequences at a time in response to said frame pulses and said command, distributing the time division multiple access signals of each up-link sequence to the down-link sequences for the respective zones in compliance with the selected one of said first and said second sequences, and interspersing a plurality of down-link frame alignment bursts in each time division multiple access signal of each down-link sequence in synchronism with said frame pulses during distribution of said time division multiple access signals, said selecting, said distributing, and said interspersing steps being carried out on board said satellite, the improvement wherein:

said selecting step comprises the steps of:
counting said frame pulses to a predetermined natural number to define super-frame time slots at a super-frame period equal to said frame period multiplied by said predetermined natural number; and
switching said first and said second sequences from one to the other with reference to said super-frame time slots and said command;
said interspersing step comprising the step of making each down-link sequence include information relative to said super-frame time slots;
said method further comprising the step of making the earth station of the respective zones synchronize the time division multiple access signals of the respective up-link sequences during the super-frame time slots specified by the information included in the respective down-link sequences.

2. A satellite communication method as claimed in claim 1, wherein said interspersing step comprises the steps of:
generating super-frame bursts during the respective super-frame time slots;
producing frame synchronizing bursts in response to the frame pulses except for each frame pulse counted to said predetermined natural number; and
interspersing said frame synchronizing bursts in each time division multiple access signal of each down-link sequence as said down-link frame alingment bursts and said super-frame bursts in each down-link sequence as said information.

3. A satellite communication method as claimed in claim 1, said frame pulses defining frame time slots, respectively, each time division multiple access signal of each up-link sequence including a plurality of up-link frame alignment bursts at said frame period, said distributing step comprising the step of distributing those portions of the up-link frame alignment bursts of each up-link sequence to the respective down-link sequences which are coincident with said frame time slots, wherein said interspersing step comprises the step of preventing distribution of said up-link frame alignment burst portions during each super-frame time slot, said up-link frame alignment burst portions serving as said down-link frame alignment bursts, respectively, after the time division multiple access signals of the respective up-link sequences are synchronized.

4. A satellite communication method as claimed in any one of claims 1, 2, or 3, wherein said switching step is carried out during one of said super-frame time slots that follows said command.

5. In a circuit arrangement for use on board a satellite in carrying out communication among a plurality of terrestrial zones, each comprising at least one earth station, said at least one earth station being used for sending an up-link sequence of time division multiple access signals to said circuit arrangement and for receiving a down-link sequence of time division multiple access signals from said circuit arrangement, one of the earth stations of said zones being for sending a format specifying signal and a format switching command to said circuit arrangement, said circuit arrangement comprising first memory means for memorizing a first switching format to produce a first sequence of switching signals, second memory means responsive to said format specifying signal for memorizing a second switching format to produce a second sequence of switching signals, frame pulse generating means for generating frame pulses at a predetermined frame period, selecting means responsive to said frame pulses and said command for selecting one of said first and said second sequences at a time, and a switching matrix responsive to the selected one of said first and said second sequences for distributing the time division multiple access signals of each up-link sequence to the down-link sequences for the respective zones, said switching matrix being operatively coupled to said frame pulse generating means to intersperse a plurality of down-link frame alignment bursts in each time division multiple access signal of each down-link sequence in synchronism with said frame pulses, the improvement wherein:

said selecting means comprises:
counting means for counting said frame pulses to a predetermined natural number to define super-frame time slots at a super-frame period equal to said frame period multiplied by said predetermined natural number; and
switching means for switching said first and said second sequences from one to the other with reference to said super-frame time slots and said command;
said switching matrix being operatively coupled further to said counting means to make each down-link sequence include information specifying said super-frame time slots, said information being for making the earth stations of the respective zones synchronize the time division multiple access signals of the respective up-link sequences during the super-frame time slots thereby specified.

6. A circuit arrangement as claimed in claim 5, wherein said circuit arrangement further comprises:
specific time slot defining means coupled to said counting means for defining the specific time slots at said super-frame period;

super-frame burst generating means coupled to said specific time slot defining means for generating super-frame bursts during the respective specific time slots;

means for supplying said super-frame bursts to said switching matrix; and means coupled to said specific time slot defining means for making said switching matrix intersperse said super-frame bursts in each down-link sequence as said information.

7. A circuit arrangement as claimed in claim 6, said frame pulses defining frame time slots, respectively, said circuit arrangement further comprising frame synchronizing burst producing means responsive to said frame pulses for producing frame synchronizing bursts at the respective frame time slots, wherein:

said specific time slot defining means is coupled further to said frame pulse generating means to define specific ones of said frame time slots as said specific time slots, respectively;

said super-frame burst generating means comprising converting means coupled to said frame synchronizing burst producing means and said counting means for converting those of said frame synchronizing bursts to the respective super-frame bursts which are produced at said specific time slots, respectively, said converting means producing the remaining ones of said frame synchronizing bursts as remaining frame synchronizing bursts, respectively;

said circuit arrangement further comprising:

means for supplying said remaining frame synchronizing bursts to said switching matrix; and means coupled to said frame pulse generating means for making said switching matrix distribute said remaining frame synchronizing bursts to each down-link sequence in synchronism with said frame pulses.

8. A circuit arrangement as claimed in claim 5, the up-link sequence reaching said satellite from each zone and having a sequence of signal time slots, wherein said circuit arrangement further comprises:

signal absorbing means for absorbing the TDMA signals of each up-link sequence;

bypassing means responsive to the up-link sequences and operatively coupled to said counting means and to said absorbing means for bypassing the TDMA signals of said each up-link sequence to said signal absorbing means during those preselected ones of said signal time slots which appear at said super-frame period to interrupt distribution of the TDMA signals of said each up-link sequence to the respective down-link sequences; and deriving means for deriving, during said super-frame time slot, each down-link sequence defining each of said super-frame time slots by absence of the TDMA signals.

9. A synchronization circuit for use in an earth station cooperating with a satellite, said satellite defining a plurality of frame time slots at a predetermined interval of time and a plurality of super-frame time slots at a super-frame period equal to said predetermined time interval multiplied by a predetermined natural number, said super-frame time slots synchronously alternating with said frame time slots at every super-frame period, said circuit being for putting said earth station into operation in synchronism with frame bursts arranged in said frame time slots by selectively sending a plurality of frame bursts at said predetermined time interval and by monitoring the frame bursts received through said satellite to compare the sent frame bursts and the received frame bursts, said satellite comprising means for specifying, for said earth station, said super-frame time slots substituted for said frame time slots at said super-frame period, said circuit being further for synchronizing said earth station with the specified super-frame time slots, the improvement wherein said circuit comprises:

generating means for generating a sequence of super-frame bursts, each lasting during each super-frame time slot;

substituting means for substituting said super-frame bursts for said frame bursts at every super-frame period;

sending means for sending said super-frame bursts in combination with said frame bursts to said satellite;

receiving means for receiving the down-link sequence together with information of said super-frame time slots defined on board said satellite;

comparing means for comparing the received super-frame bursts with the specified super-frame time slots to detect a difference between the received super-frame bursts and the specified super-frame time slots and to produce a difference signal representative of said difference; and timing means responsive to said difference signal and coupled to said substituting means for timing said super-frame bursts in accordance with said difference signal so that said super-frame bursts are received within said super-frame time slots defined on said satellite.

* * * * *